E. E. BRUNSON.
MANIFOLDING DEVICE.
APPLICATION FILED FEB. 12, 1908.
971,725.
Patented Oct. 4, 1910.
10 SHEETS—SHEET 3.
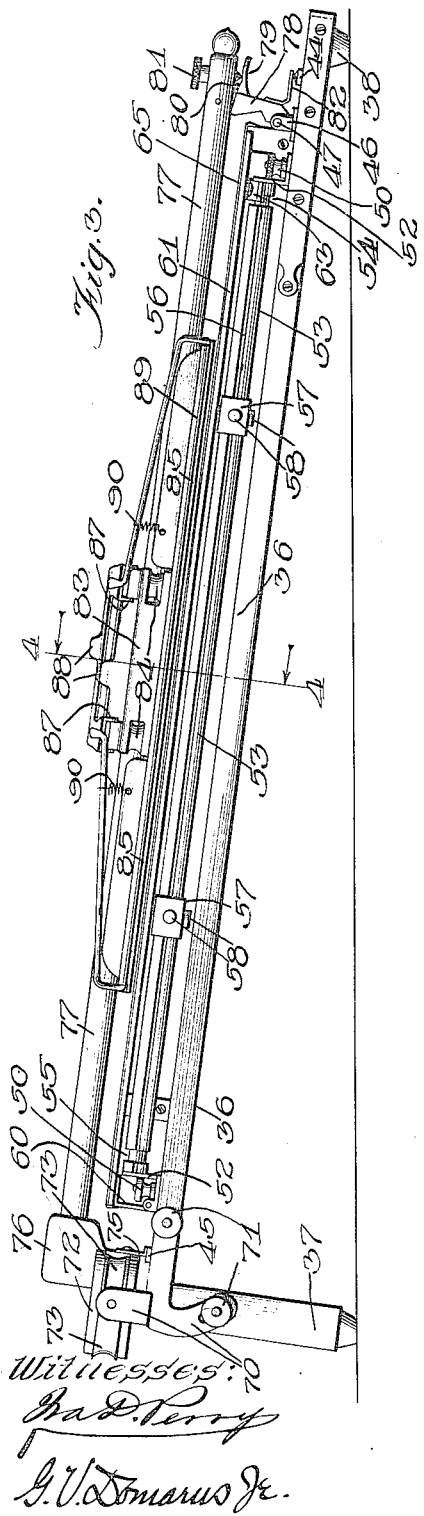
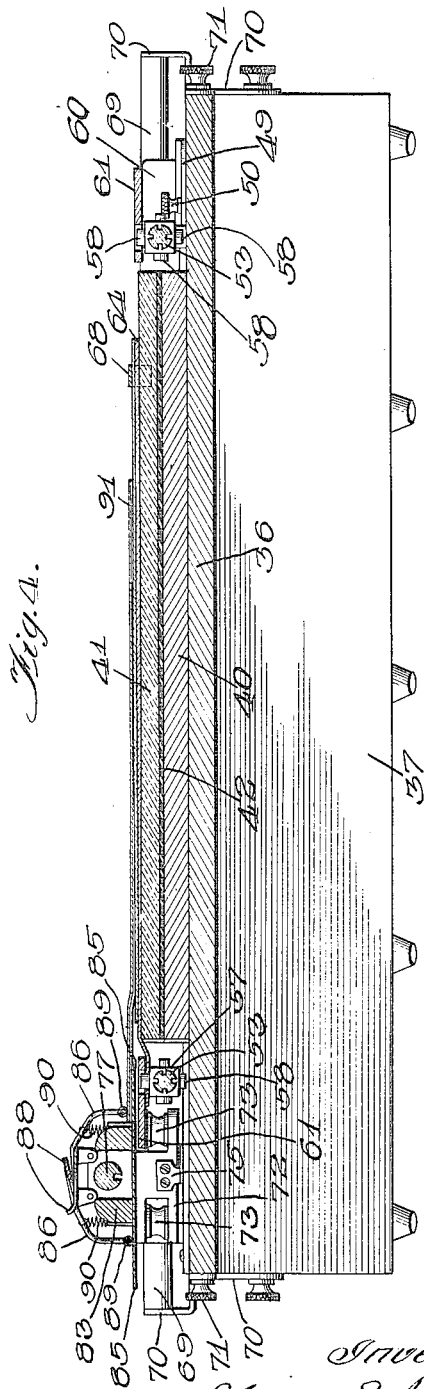

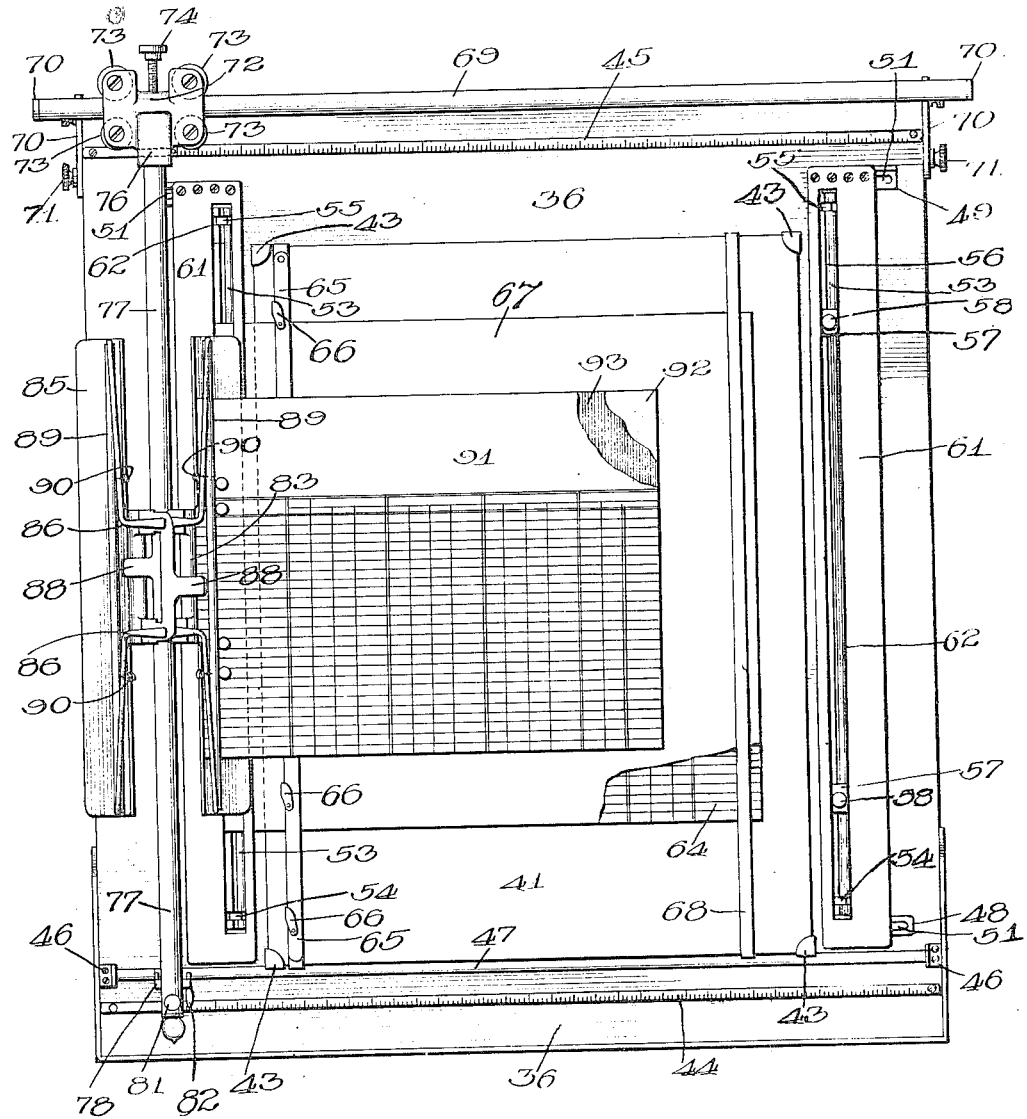

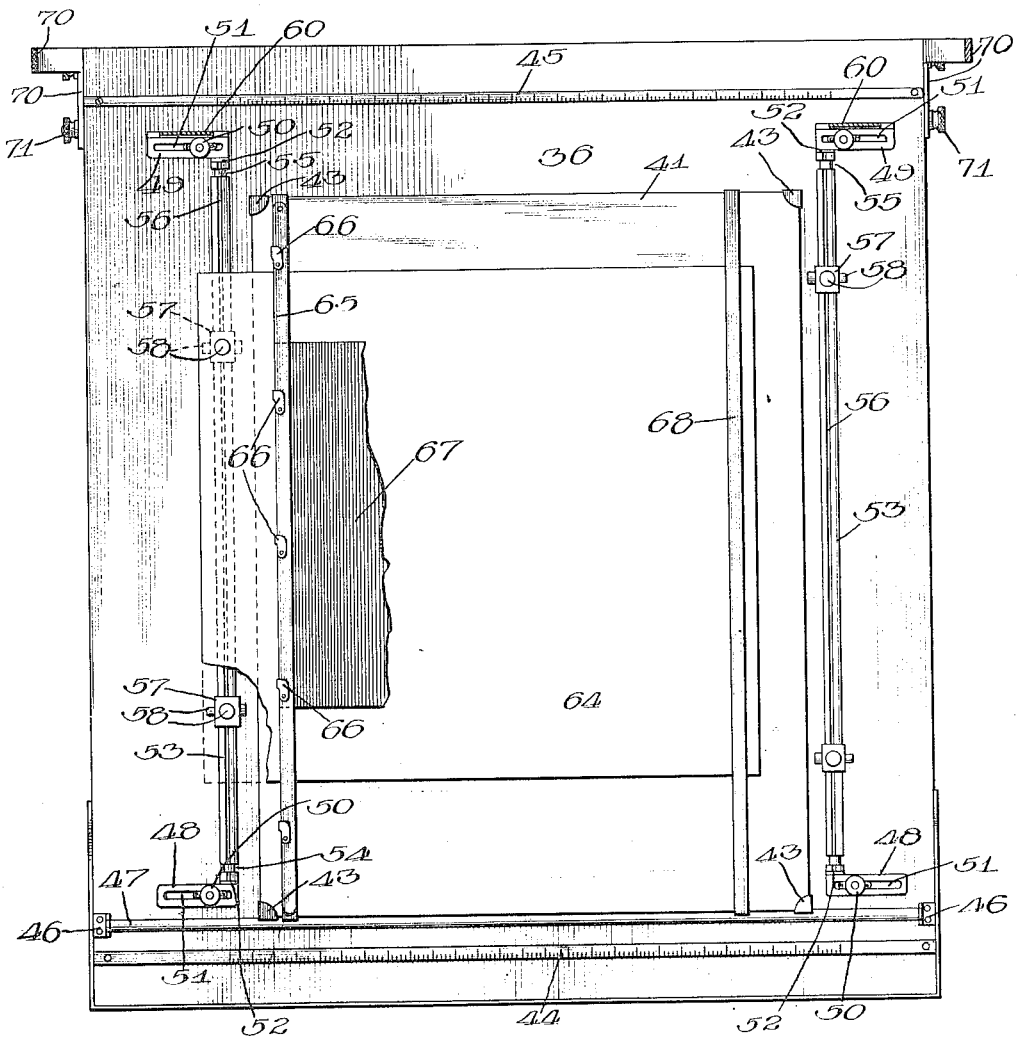

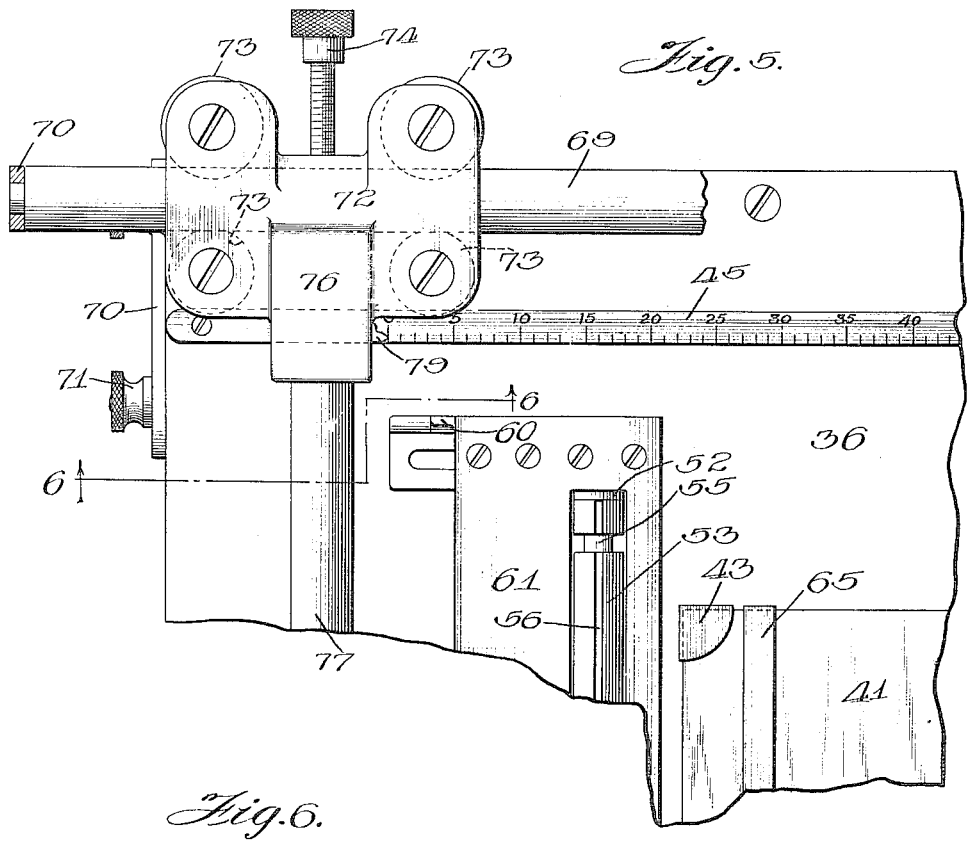
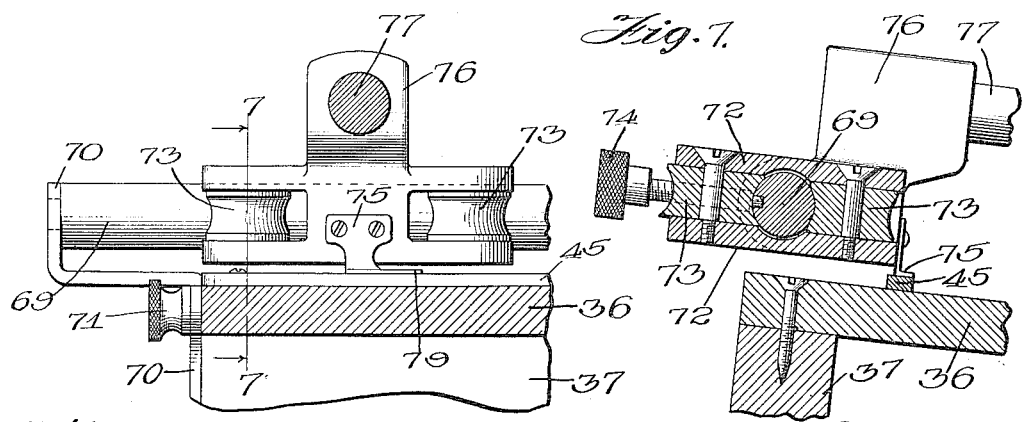

E. E. BRUNSON.
MANIFOLDING DEVICE.
APPLICATION FILED FEB. 12, 1908.

971,725.

Patented Oct. 4, 1910.
10 SHEETS—SHEET 5.

Witnesses:

Inventor:
Elmer E. Brunson

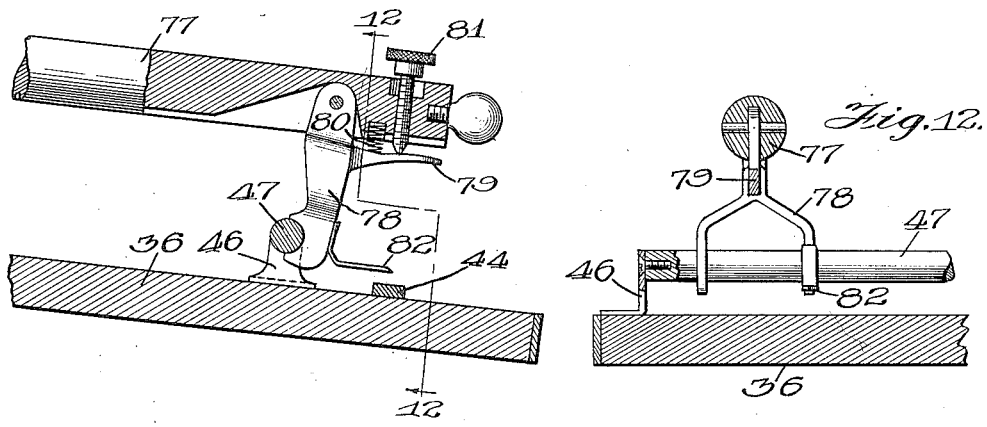

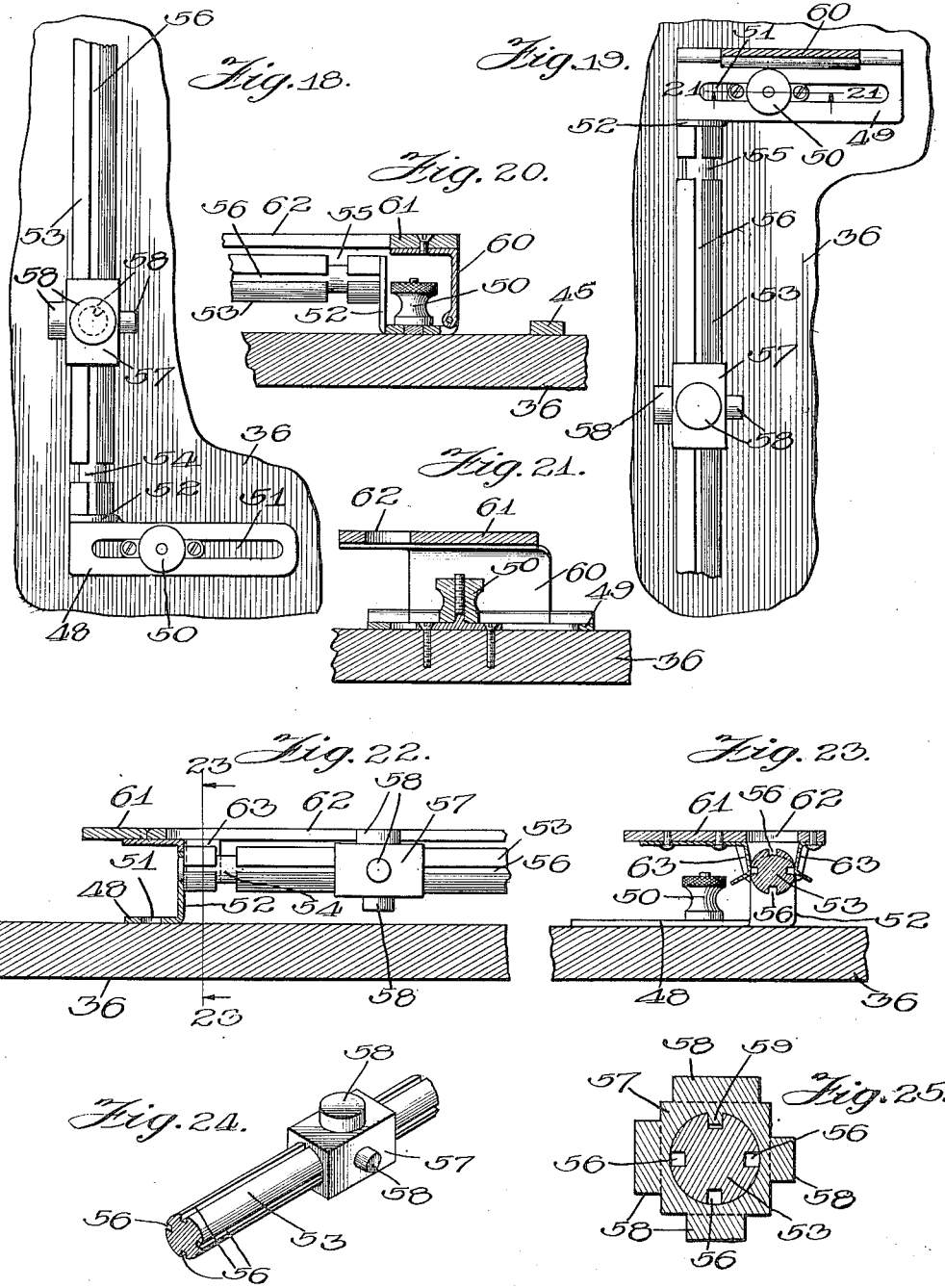

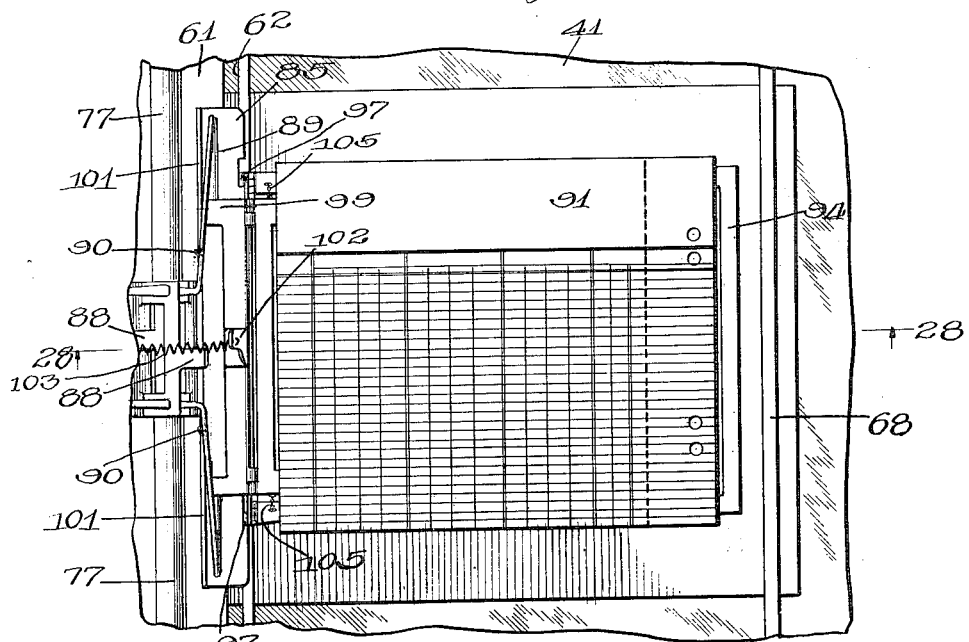
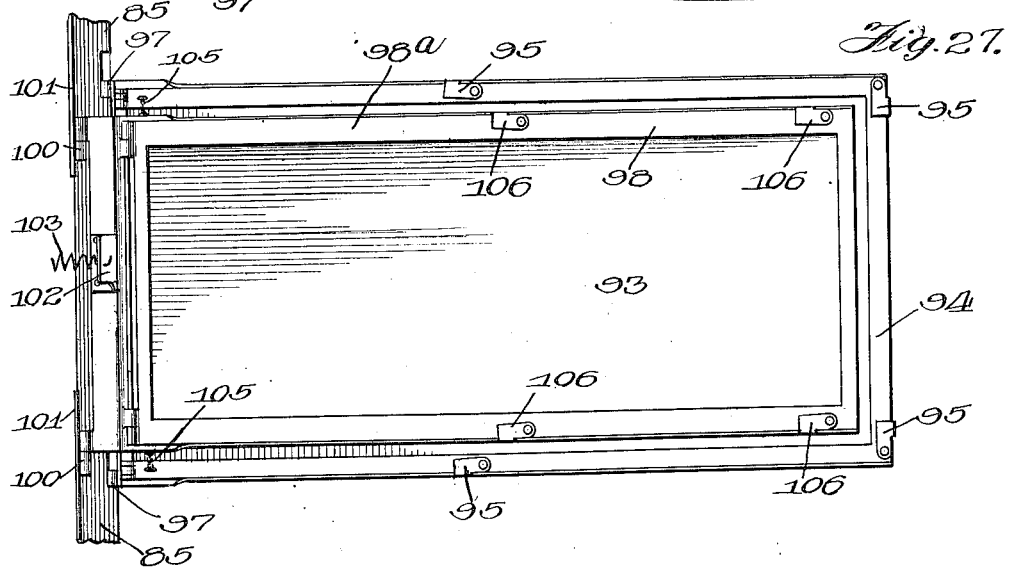

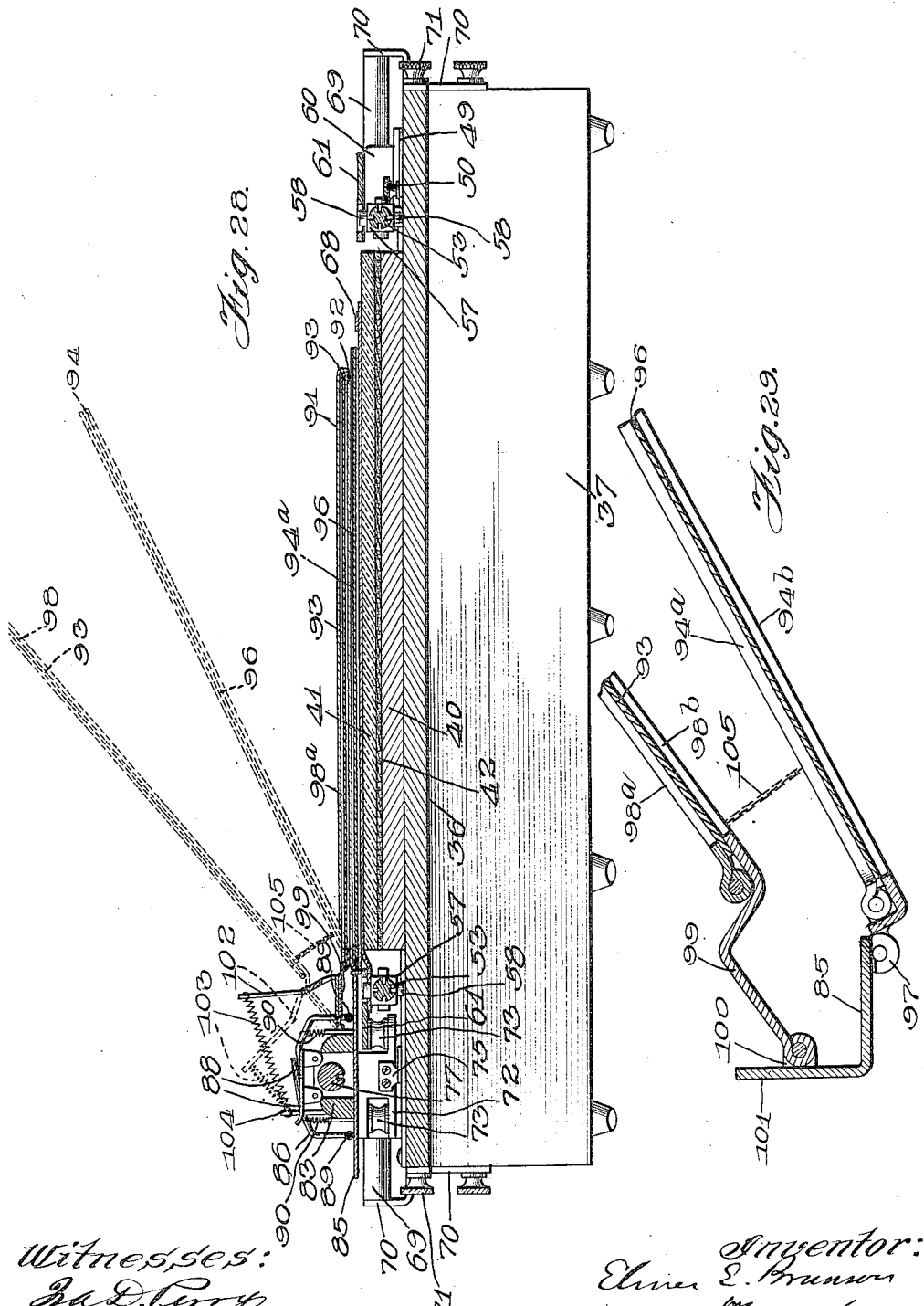

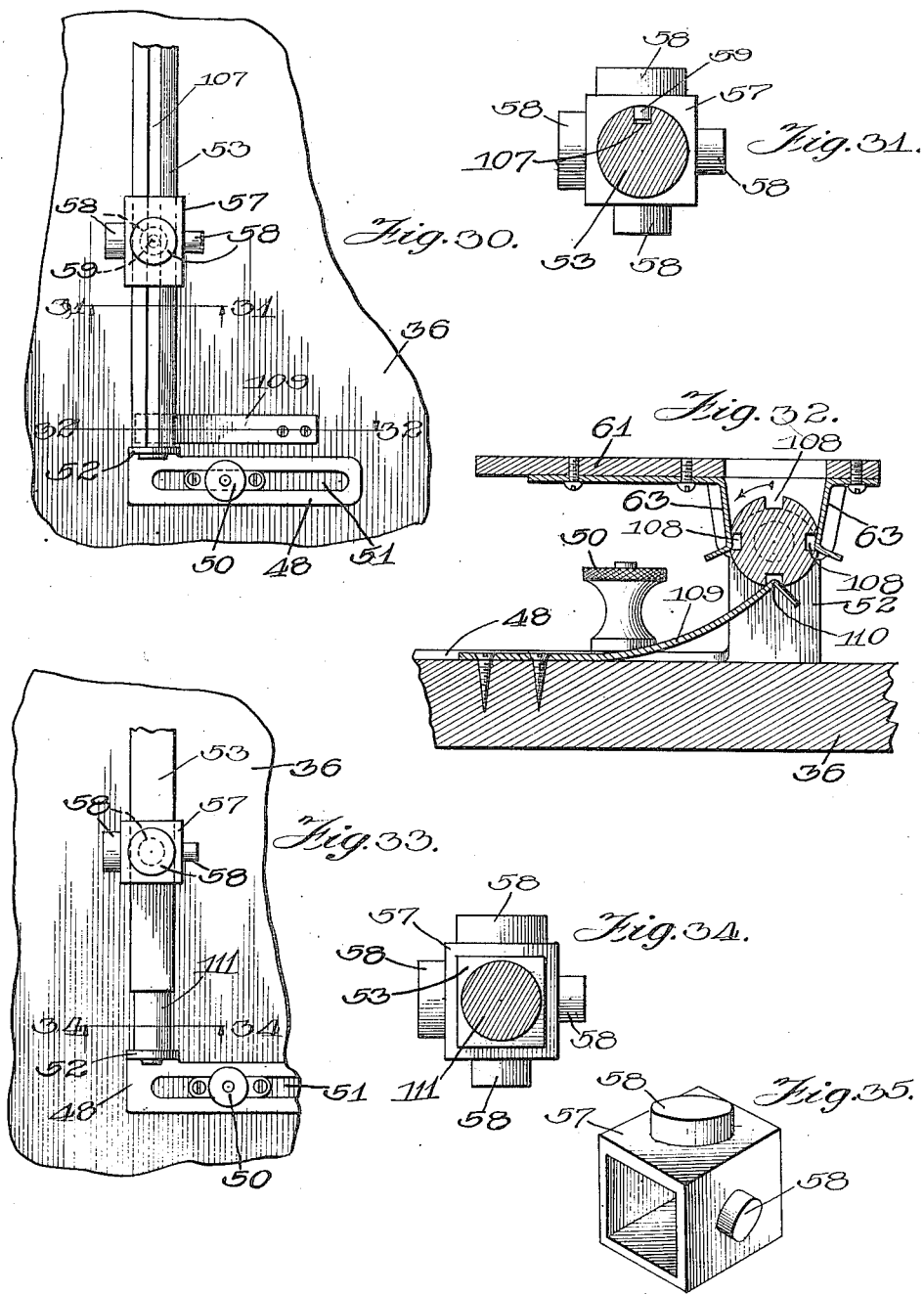

UNITED STATES PATENT OFFICE.

ELMER E. BRUNSON, OF CHICAGO, ILLINOIS.

MANIFOLDING DEVICE.

971,725.   Specification of Letters Patent.   Patented Oct. 4, 1910.

Application filed February 12, 1908. Serial No. 415,610.

*To all whom it may concern:*

Be it known that I, ELMER E. BRUNSON, a citizen of the United States, residing at Chicago, in the county of Cook and State of Illinois, have invented certain new and useful Improvements in Manifolding Devices, of which the following is a specification, reference being had to the accompanying drawings.

My invention relates to devices for use in bookkeeping and similar objects, in which an entry made on a single sheet is transferred or copied by interposed carbon or carbons to sheets lying below it, and in which it is necessary that the sheets should register with one another in order that the transferred entries may come in the proper position or column in the lower sheets corresponding with their position in the sheet above.

More particularly still my invention is applicable for use in bookkeeping in which the books are what is known as the "loose-leaf system." Its principal object is to provide a new and improved table and accompanying mechanism on which a larger sheet—as, for instance, a journal sheet—may be adjustably supported and on which is mounted mechanism adapted to carry other sheets—as, for instance, ledger sheets—and by means of which the upper sheets may be adjusted so as to lie in proper register upon the lower sheets in such a way that when an entry is made upon the upper sheet the entry, by means of interposed carbon sheet or sheets, may be transferred to the lower sheet in suitable column and position on the page,—in registry, in other words, with the entries on the sheet on which the items are first entered. My invention further consists in the improvement of such mechanisms in sundry details hereinafter pointed out.

Figure 9:
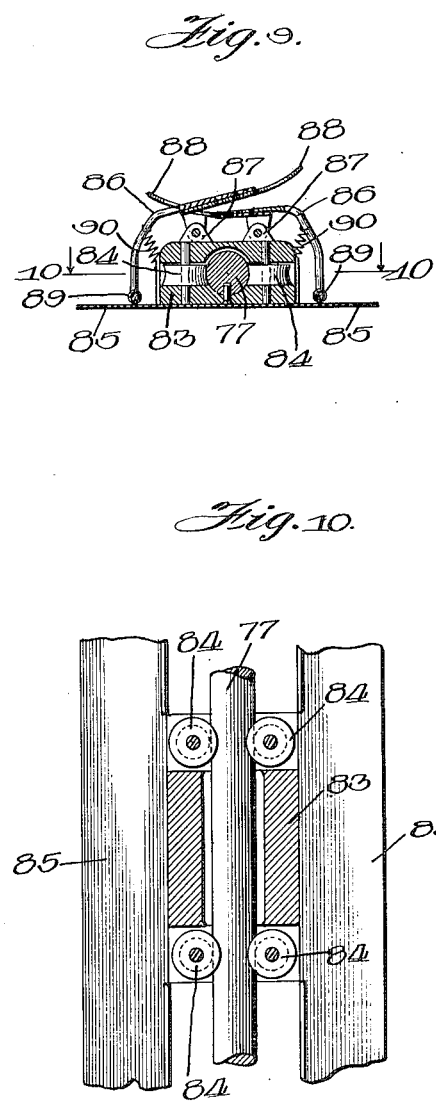
Figure 10:
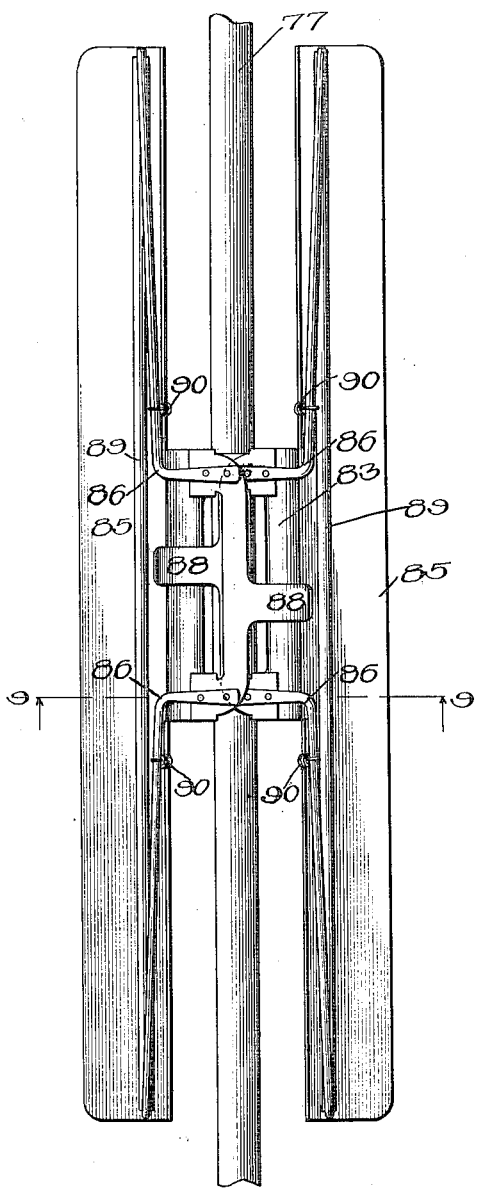
Figure 8:
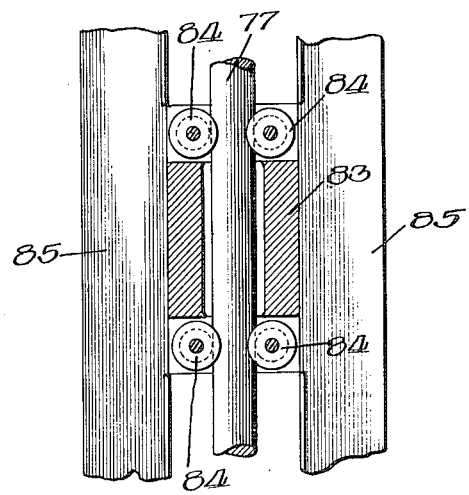

In the drawings,—Figure 1 is a top or plan view of my device, Fig. 2 is a top or plan view of the table upon which the lower sheet is supported with its holding devices, other parts carrying the upper leaves being removed; Fig. 3 is a side elevation; Fig. 4 is a section on line 4—4 of Fig. 3; Fig. 5 is an enlarged detail, being a view of the upper left-hand corner of the device; Fig. 6 is an enlarged detail, being a vertical section of a portion of the upper left-hand corner of the device on line 6—6 of Fig. 5; Fig. 7 is an enlarged detail, being a section on line 7—7 of Fig. 6; Fig. 8 is an enlarged detail, being a plan view of the upper sheet-holding devices; Fig. 9 is an enlarged detail, being a section on line 9—9 of Fig. 8; Fig. 10 is an enlarged detail, being an enlarged section on line 10—10 of Fig. 9; Fig. 11 is an enlarged detail, being a view of the holding mechanism shown at the right-hand end of Fig. 3 and partly in section; Fig. 12 is an enlarged detail, being a section on line 12—12 of Fig. 11; Fig. 13 is an enlarged detail, being a view of the lower left-hand corner of the supporting table; Fig. 14 is a detail, being a section on line 14—14 of Fig. 13; Fig. 15 is an enlarged detail, being a section of a portion of the writing table through the lower edge on line 15—15 of Fig. 13; Fig. 16 is an enlarged detail, being a portion of one end of the graduated guide strip; Fig. 17 is an enlarged detail, being a view of a portion of one end of the carbon holder by means of which the carbon sheets are held upon the table against the lower sheet; Fig. 18 is an enlarged detail, being a view of the lower end of the rods on which the sliding upper sheet holders are mounted; Fig. 19 is an enlarged detail, being a view of the upper end of the same parts as Fig. 18; Fig. 20 is an enlarged detail, being a view of the upper end of the rod on which are mounted the sheet-supporting devices and coacting plate; Fig. 21 is an enlarged detail, being a section on line 21—21 of Fig. 19; Fig. 22 is an enlarged detail, being a view of the lower end of the rod and under sheet-supporting devices, partially in section; Fig. 23 is an enlarged detail, being a section on line 23—23 of Fig. 22; Fig. 24 is an enlarged detail, being a view of one of the supporting rods and the slide-block mounted thereon; Fig. 25 is an enlarged detail, being a vertical section through the rod and slide-block; Fig. 26 is a plan view, showing another form of carbon holder and upper sheet holder; Fig. 27 is a plan view of the lower carbon holder and of the upper carbon and sheet holder shown in Fig. 26 somewhat enlarged; Fig. 28 is an enlarged detail, being a section on line 28—28 of Fig. 26; Fig. 29 is an enlarged detail, being a longitudinal section through a portion of the upper and lower sheet and carbon holders; Fig. 30 is an enlarged detail, showing a modified form of devices for holding the lower sheet; Fig. 31 is an enlarged detail, being a section on line 31—31 of Fig. 30; Fig. 32 is an enlarged detail, being a section on line 32—32 of Fig. 30; Fig. 33 shows another modified form of the parts shown in Fig. 30; Fig. 34 is an enlarged detail, being a section on line 34—34 of Fig. 33; and Fig. 35 is an enlarged detail, being an isometric view of the sliding stud holder shown in Fig. 34.

Referring to the drawings,—36 indicates a base, which is preferably mounted upon supporting legs 37—38. The legs 37 at the top of the supporting base are preferably longer, as is shown in Fig. 3, so that the base may be inclined somewhat for convenience in writing. Upon the base 36 is supported a table 39 which, as is best shown in Figs. 4, 14 and 15, is composed of a base-plate 40 of suitable hard wood secured to the base 36 by suitable screws and of a glass plate 41 with interposed felting 42 between them. These plates are held together by means of corner clips 43, best shown in enlarged detail Figs. 13 and 14, the upper portion of which is bent over to engage the upper surface of the glass plate 41 and the lower portion of which is screwed to the bed-plate 40, locking the glass plate and bed-plate together with the felt between them. This forms a table upon which the sheets are supported while the writing is being done.

Referring particularly to Fig. 2, in which the parts now about to be described are more clearly shown because of the removal in said figure of the superposed parts,—44—45 indicates graduated guide-strips which are secured to the top of the base 36, parallel with each other, and whose graduations register with each other in the two strips. 47 indicates a rod, which is secured in suitable brackets 46 upon the top of the base 36 so as to lie close to the lower end of the base-plate 40. The rod is preferably cylindrical in section, as is shown. Referring still to Fig. 2 and also to Figs. 18 to 25, 48—49 indicate plates, of which two—48—are mounted respectively upon the top of the base 36 toward the lower end upper edges thereof, respectively. The plates 48 and 49 are adjustably secured to the base 36 by means of set-screws 50 which pass through suitable slots 51 in the base of the supports 48—49. It will be readily seen that by means of these slots the pairs of plates may be adjusted laterally with reference to the central longitudinal line of the board. The plates 48—49 are provided with integral upright portions 52 in which are mounted rods 53 which, in the form shown in the figures under consideration, are rigidly secured in the said supports. The rods 53 are provided near their upper and lower ends with peripheral grooves 54—55, respectively, and are each provided with a plurality of longitudinal slots 56 which are preferably four in number and parallel to each other and ninety degrees apart,—the slots corresponding in depth with the peripheral grooves 54—55.

57 indicates blocks perforated so as to slide freely but snugly and smoothly upon the rods 53. These blocks are preferably square in cross-section and provided upon each one of their sides with studs 58 which vary in size in order to engage different sized perforations in loose-leafed sheets, as hereinafter described. Each of these studs has an inwardly-projecting lug 59 which is adapted to engage any one of the grooves 56, preventing rotation of the block 57 upon the rods 53. It will be obvious that these blocks may be slid longitudinally of the rods into any desired position thereon with one or the other of the studs 58 uppermost, as may be desired, being prevented from rotation by the engagement of the lug 59 with one of the slots. When it is desired to change the block so as to present another stud upon its upper surface the blocks are slid upon the rods until the projecting lug 59 registers with the peripheral groove 54, 55 in which position the lug will be freed from the longitudinal groove and the block may be turned into the desired position and again slid upon the grooved portion of the rods and be prevented from turning in the same manner as before.

60 indicates a bent-plate which is hinged to the plate 49, as is best shown in Fig. 20.

61 indicates a long plate which is secured at one end to the hinged plate 60 and is provided with a longitudinal slot 62 extending nearly throughout its length, which slot 62 when the plate is in the position shown in Figs. 1, 20, 21 and 22 registers with the studs 58 on the blocks 57 so as to permit the passage of the studs upward into said slot.

63 indicates springs, which are fastened upon the under side of the plate 61 near its upper end and have their free ends bent to form an angle so as to enter and engage the slots 56 of the rods 53 and yieldingly lock the plate 61 in position, as is best shown in Fig. 23, insuring the proper registry of the parts. 64 indicates a sheet of paper, such, for instance, as the loose-leaf sheets of a journal, which come usually provided with perforations upon one of their edges, by means of which the sheets are placed together when entries are made upon them. This sheet is secured upon one or the other of the rods 53, as may be preferred, by lifting the plate 61, adjusting the slide blocks 57 with suitable-sized studs uppermost and in such position on the rods 53 as to engage the openings on the sheet 64. Being adjusted to suitable position on the table, the plate 61 is brought down into position and locked by the spring 63, thus holding the sheet 64 in proper position upon the table and adapted for use, as hereinafter described. It is obvious that if the perforations are not in proper alinement with the edges, or the line of the holes is not parallel with the edge of the sheet, or the sheet requires adjustment for any other reason, it may be adjusted to the right position upon the table by loosening the set-screws 50 and sliding one or both of the brackets 48, 49 until the suitable registry is secured, when the plates are held in position by again screwing in the set-screws.

65 indicates a carbon-holder, which is formed of two strips—an upper and a lower—pivotally secured together near one end and provided with a number of clips 66 which are pivoted upon the upper strip and are adapted to be swung out so as to free the strips or swung in to lock them together. This is best shown in detail in Fig. 17.

67 indicates a carbon-sheet, which is held in the carbon-holder 65 so as to lie upon the sheet 64. The ends of the strips 65 are bent over, as is best shown in Figs. 15 and 17, so as to engage the beveled edge of the glass-plate 41 and thus yieldingly hold the carbon-holder in place.

68 indicates a metal strip whose ends are bent over to engage the beveled sides of the glass-plate 41 and is adapted to be laid upon the under sheet 64 and carbon to assist in holding them in place.

69 indicates a rod, preferably cylindrical in section, which is journaled in bearings 70 which are secured to the base 36 by set-screws 71 (see Figs. 1, 5 and 6).

72 indicates a carriage in which are journaled four rollers 73—two upon each side—which are hollowed in their periphery and are adapted to engage the rod 70 between the pairs on each side so that the carriage 72 may slide freely but without any lost motion along the rod 69, as is best shown in Figs. 5, 6 and 7. The rod 69 is preferably provided with a longitudinal groove at its back into which the end of a set-screw 74 is adapted to enter, as is best shown in Fig. 7. The set-screw 74 is screwed into the back of the carriage and is adapted to lock the carriage in any desired position.

75 indicates an index-finger, which is secured to the carriage and comes just above the graduated guide-strip 45.

76 indicates a socket, which is preferably formed integral with the carriage 72 and in which is mounted a rod 77 which is preferably circular in section. The rod extends almost the entire length of the board below the graduated guide-strip 44 and is provided at its end with a latch 78 which is adapted to engage with the rods 47, as is best shown in Fig. 11. The latch 78 is provided with a thumb-piece 79, against the upper side of which bears a coiled spring 80 seated in a suitable socket in the lower end of the rod 77 and tending to force the thumb-piece 79 downward.

81 indicates a set-screw screwed into the lower end of the rod 77 above the thumb-piece 79 and bears upon the upper side of the thumb-piece 79 so as to hold the parts in the position shown in Fig. 11, in which the latch is shown as engaged with the rod 47, supporting it in a position parallel to the bed-plate 36 and some distance above the same.

82 indicates a pointer, which is secured to the latch 78 and comes just above the lower graduated guide-strip 34, as is best shown in Figs. 1 and 11. It is obvious that by unscrewing the set-screw 81 the latch 78 may be moved away from the bars 47 by the thumb-piece 79, and the bar 77 may be tilted or swung upward to lift the parts supported by it, as hereinafter described, out of the way when desired. When brought into its normal operative position (the position shown in Figs. 1 and 11) the bar, as has been said, will be parallel with the surface of the base 36 and therefore with the glass-plate 41 and will be supported in the position shown in Fig. 11. By screwing down on the thumb-screw 11 the bar 77 may be locked in place at any adjustment indicated by the index-finger 82 to correspond with the position of the index-finger 79 on the upper guide-strip 45 in order to accurately adjust the rod 77 in position to cause the registration of the parts carried by it, hereinafter described, with the lower sheet 64.

Referring to Figs. 1, 3, 4, 8, 9, 10, where the parts about to be described are best shown,—83 indicates a carriage in which are mounted rollers 84 arranged in pairs, two upon each side of the center line of the carriage, as is best shown in Fig. 10, and grooved on their surfaces so as to closely engage the rod 77, as is best shown in Figs. 9 and 11, whereby the carriage may be freely slid along the rod 77 but without lost motion or shaking in any way. 85 indicate plates, which are secured to the under side of the carriage 83 and extend to each side of the rod 77 and parallel therewith. The inner edge of each of the plates 85 is bent substantially at right angles with the rest of the plate, whereby it serves as a gage-plate to gage the carbon and other sheet.

86 indicates clips, which are pivoted upon ears 87 secured to the top of the carriage 83 and are provided with thumb-pieces 88. The clips 86 support bearing-rods 89, which are preferably covered with rubber, and which are adapted to rest and bear against the plates 85 so as to secure the paper sheets hereinafter described between them, as is best shown in Fig. 4. Retractile springs 90 secured at one end to the clips 86 and at the other end to the carriage 83 yieldingly hold the clips in the position shown in the respective figures above referred to. I prefer to provide the carriage 83 with plates 85 upon each side thereof, in order that if it is more convenient to work from the right-hand side of the table instead of from the left, as is shown in the figures, the rod 77 may be simply moved to that side and the paper supported in the other clip without the necessity for moving the parts. I also prefer to place upon each side of the bedplate 36 the rod 53, plates 61 and their mountings, as above described, in order that in case it is desirable to work the lower sheet from the right instead of from the left-hand side of the board the lower sheet may be mounted upon the right-hand side of the board instead of the left, as shown, without having to take the parts off from one side and replace them on the other.

91 indicates an upper sheet—such, for instance, as a ledger sheet—and 92 a duplicate sheet with transfer paper 93 between them. These sheets are placed together and are held upon the plate 85 by means of one of the clips 86, as is best shown in Figs. 1 and 4. It will be obvious that by shifting the carriage 72 on the upper bar 79 to the right or left and by shifting the carriage 83 up or down the rod 77 the sheets 91—92 with their interposed carbon may be adjusted accurately over the lower sheet 64, so that the divisions in which figures or other characters are to be written will correspond and register with the corresponding divisions of the lower sheet. For instance, let us suppose that the upper two sheets are the ledger sheet upon which entries are made and that the lower sheet is the journal sheet containing the total transactions. Upon the upper sheet 91 from the sales slips or similar slips of original entry will be entered the ledger items to be charged or credited to a given person's account. This will be transferred by the carbon 93 to the sheet 92, which will be a duplicate ledger sheet, one of which ledger sheets may be in the system of bookkeeping to which this device is peculiarly applicable sent to the customer or person to whom the account runs. The upper sheets being adjusted to the proper position to register with the lower sheet the items entered will be transferred by the carbon 67 to the lower or journal sheet,—beginning, of course, at the top of the page if the items to be entered are the first ones upon the page. As soon as all the items desired to be entered upon the particular ledger sheet in question have been entered and have been transferred to the lower or journal sheet a check may be made in the margin of the journal sheet by the operator indicating where the last item came. The upper sheets will be removed from the clips and new ledger sheets for another account inserted in their place. The carriage 83 will then be adjusted so that the first of the items to be written upon the ledger sheet will come in their proper place, as indicated by the mark in the margin of the lower sheet, the ledger items to that account written upon the upper sheet and transferred by the carbons, as before, to the lower or journal sheet in proper registers, as before. This process will be repeated until the journal sheet is full, when the latch on the rod 77 is released, the rod and carriage tilted out of the way and new journal sheets placed upon the lower table and the process repeated with sheet after sheet.

In Figs. 26 to 29, inclusive, I have shown a modified form of devices for holding the lower carbon or transfer paper upon the lower sheet and for holding the upper sheets and their carbon. Referring to these figures, 94 indicates a rectangular frame, which is composed of an upper member 94$^a$ and a lower member 94$^b$, which may be fastened together by clips 95 pivoted on the upper member, as best shown in Fig. 27. The upper member 94$^a$ is hinged to the end of the lower member 94$^b$, as is best shown in Fig. 29, so that it may be raised therefrom and the carbon or transfer paper 96 be placed between them and locked by means of the clips 95. The lower member 94$^b$ is hinged to the under side of the plate 85 by means of lugs 97 depending from the downward surface thereof, as is best shown in Fig. 29. The upper and lower members 94$^a$—94$^b$ are composed of thin strips of metal so as to hold the carbon close to the lower sheet to be written upon.

98 indicates a frame adapted to support the upper carbon and the smaller or upper sheets. It is rectangular in shape and is composed of upper and lower members 98$^a$—98$^b$ similar to the frame 94. The upper member 98$^a$ is hinged to the lower member 98$^b$, as is best shown in Fig. 29, and the upper member is provided with extension plates 99 which are bent over nearly at a right angle, as is best shown in Fig. 29, and which are hinged to lugs 100 on upright portions 101 of the plates 85, or directly to the sides of the carriage 83. The lugs are located a little distance above the top of the plate 85 and the extension plates 99 are bent, on account of this elevation of the lugs 100, so that the frame 98 may lie closely against the frame 94 when in operative position for writing.

102 indicates a thumb-piece which is secured to the extension-plate 99 and is connected by a spring 103 to a suitable lug or pin 104 in the carriage 83, the spring tending to lift the frame 98 into the position shown in dotted lines in Fig. 28.

105 indicates a short chain which connects the frames 98 and 94 so that when the frame 98 is lifted the frame 94 may be carried with it when the chain connects the two. Of course, the chain may be disconnected so that only one may be lifted at a time, when desirable. The frame 98 is provided like the frame 94 with clips 106 by means of which the carbon or transfer sheet may be held in the frame. In this case the upper or ledger sheets 91—92 are formed of a single piece and are folded together so as to register with one another and are supported upon the frame 98 by placing the frame between them with its front edge in the fold, as is shown in Figs. 26 and 28. With this structure the adjustment of the carriage is obtained exactly as above described, the only difference being in the manner of holding the upper sheets, and the operation is precisely the same as above described.

Figs. 30, 31 and 32 indicate modifications of the rod 53 and the holding block 57 above described. In this case the rod 53 is provided with only a single longitudinal groove 107, and the block 57 with its accompanying arm slides thereon and is provided with studs 58 of different sizes, and in all respects resembling the block above described, and is provided also with the lug which engages the single longitudinal groove 107. At the end, however, of the rod 53, as is best shown in Fig. 32, the rod 53 is provided with a plurality of grooves 108 which extend inward a suitable distance longitudinally of the rod 54 from its lower end. When the block 57 is four-sided, as shown, these grooves will be four in number, one to correspond and register with each face of the block. Of course, the number of faces of the block and the number of studs may be varied in each case. The number of grooves will correspondingly vary so as to register one with each face of the block. 109 indicates a spring secured to the bed-plate 36 and having a sharpened angle 110 adapted to enter notches 108. The spring is so formed as to press against the rod 53 and yieldingly hold its angular portion 110 in engagement with one or the other of the grooves whenever they come opposite it. It will be obvious that from the above description the entire rod 53 may be turned against the action of the spring in the direction indicated by the arrow in Fig. 32 and any desired face of the block 57 be brought uppermost.

Figs. 33, 34 and 35 indicate another modification of the rod 53 and the holding block 57. In this case the rod 53 is squared in section throughout that part in which the blocks 57 are held while in operative engagement, and the opening in the block 57 is squared accordingly. Near the lower end of the rod 53 a portion of it 111 is circular in section, as is best shown in Fig. 33. Whenever it is desired to change the position of the block so as to bring another one of the studs into operative position, the block 57 is slid down the rod until it registers with the rounded portion 111 when it may be turned into the desired position and again slid back upon the rod.

I have described and illustrated my mechanism as being used for bookkeeping purposes, and particularly in that system of bookkeeping in which what is known as loose-leafed books are used, and I have also for the purpose of illustrating its operation described the use of loose ledger sheets and journal sheets.

It will be obvious from the above description that by means of this mechanism the operation of bookkeeping with such loose leaves may be very much simplified and made very easy, requiring only a single operation of writing the entries which are at once transferred to the other sheets into the suitable columns and in suitable position in perfect registration, and that such registration is by means of my mechanism easily and accurately secured. It will be obvious, however, that my machine may be used for other purpose in which it is desirable to make any entries and simultaneous transfers thereof to other sheets which require similar registration, and I do not confine my invention to use in merely keeping of books.

That which I claim as my invention, and desire to secure by Letters Patent, is,—

1. The combination with a table, means for adjustably holding a sheet of paper on said table, and means for holding a carbon transfer sheet above said sheet of paper, of a rod mounted on said table, a carriage slidingly mounted on said rod, means on said carriage for securing a second sheet of paper thereto, and means for adjusting said rod and carriage to cause said second sheet of paper to overlie said first sheet of paper and carbon in any desired registry with said under sheet.

2. The combination with a table, means for adjustably holding a sheet of paper on said table, and means for holding a carbon transfer sheet above said sheet of paper, of a rod pivotally connected at one end with said table, means for clamping said rod at its free end to said table in substantial parallelism with the surface of said table, a carriage slidingly mounted on said rod, mechanism carried by said carriage for supporting a second sheet of paper thereon, and means for adjusting said rod and said carriage on said rod to cause said second sheet of paper to overlie said first sheet in any desired registry therewith.

3. The combination with a table, and a rod adjustably secured to said table, of holding blocks slidingly mounted on said rod, a plurality of engaging studs on said holding blocks adapted to engage perforations in a sheet of paper, and means for holding said holding blocks on said rod against rotation with any one of said studs uppermost in engaging position.

4. The combination with a table, a rod adjustably secured to said table and having a plurality of parallel longitudinal grooves and a peripheral recess near one end, of a holding block slidingly mounted on said rod and having a plurality of engaging studs of different sizes adapted to engage with the perforations in a sheet of paper, and a lug on its interior surface adapted to engage any of said grooves whereby said block may be rotated on said rod by bringing said stud in register with said circular recess and may be held against rotation with any one of its studs in engaging position by the engagement of said lug with one of said grooves.

5. The combination with a table, and means for adjustably holding a sheet of paper on said table, of an adjustable rod mounted on said table, and means for clamping said rod in any desired position thereon, a carriage mounted on said rod and movable longitudinally thereof, and a frame hinged to said carriage and adapted to hold a transfer sheet.

6. The combination with a table, means for adjustably holding a sheet of paper thereon, and means for holding a transfer sheet on said table above said sheet of paper, of an adjustable rod mounted on said table, means for clamping said rod in any desired position thereon, a carriage mounted on said rod and movable longitudinally thereof, and a frame hinged to said carriage and adapted to hold a transfer sheet and adapted to support a second sheet of paper.

7. The combination with a table, and means for adjustably holding a sheet of paper on said table, of a rod mounted on said table and adjustable thereon, means for clamping said rod in any desired position on said table, a carriage slidably mounted on said rod, a transfer-paper holding-frame hinged to said carriage, and a second transfer-paper holding-frame hinged to said carriage above said first frame and adapted to support a second sheet of paper.

8. The combination with a table, and means for adjustably holding a sheet of paper on said table, of a rod mounted on said table and adjustable thereon, means for clamping said rod in any desired position on said table, a carriage slidably mounted on said rod, a frame mounted on said carriage and composed of two parts adapted to hold a transfer sheet between them, clips adapted to lock said two parts together, a second frame mounted on said carriage and composed of two parts adapted to hold a transfer sheet between them, clips adapted to lock said parts together, and a spring adapted to normally lift said frames away from said table.

9. The combination with a table, and means for adjustably holding a sheet of paper on said table, of a rod secured to said table near one end thereof, a carriage slidingly and tiltably carried by said rod, a second rod secured to said carriage substantially at right angles with said first rod, means for clamping the other end of said rod in a position substantially parallel with the surface of said table, a second carriage mounted on said second rod and movable longitudinally thereof, and means on said second carriage for securing thereto a second sheet of paper.

10. The combination with a table, and means for adjustably holding a sheet of paper on said table, of a rod secured to said table near one end thereof, a carriage slidingly and tiltably carried by said rod, a second rod secured to said carriage substantially at right angles with said first rod, means for clamping the other end of said rod in a position substantially parallel with the surface of said table, a second carriage mounted on said second rod and movable longitudinally thereof, means on said second carriage for securing thereto a second sheet of paper, and means for mounting on said second carriage a second carbon transfer sheet and second sheets of paper.

11. The combination with a table, and means for adjustably holding a sheet of paper on said table, of a rod secured to said table near one end thereof, a carriage slidingly and tiltably carried by said rod, a second rod secured to said carriage substantially at right angles with said first rod, means for clamping the other end of said rod in a position substantially parallel with the surface of said table, index pointers on said carriage and on the other end of said rod, graduated guide-strips parallel with said first-named rod and lying below said index fingers, respectively, in register with each other, a second carriage mounted on said second rod and movable longitudinally thereof, means on said second carriage for securing thereto a second sheet of paper, and means for mounting on said second carriage a second carbon transfer sheet and second sheets of paper.

12. The combination with a table, means for adjustably holding a sheet of paper thereon, and means for holding a carbon transfer sheet above said sheet of paper, of a rod mounted near one end of said table, a tiltable carriage mounted on said rod and slidable longitudinally thereof, means for clamping said carriage at any point on said rod, a second rod secured at one end to said carriage, a third rod mounted on said table near the other end thereof and parallel with said first rod, a spring-seated latch carried by said second rod near its free end and adapted to engage said third rod, means for locking said latch against said third rod, a carriage slidably mounted on said second rod, and means on said carriage for holding a second sheet of paper thereon.

13. The combination with a table, a pair of slotted plates mounted on said table near its opposite ends, and set-screws adapted to secure said slotted plates on said table, of a rod carried by said slotted plates, blocks mounted on said rod, adjustable longitudinally thereof and adapted to hold a lower sheets of paper, means for holding a transfer sheet above said lower sheet of paper, a carriage mounted on said table and adjustable longitudinally thereof substantially in a line parallel with said rod, and means on said carriage for holding an upper sheet of paper thereon.

14. In a manifolding device, the combination with a platen adapted to receive a record sheet, of means comprising a frame adapted to releasably hold a transferring-sheet and to removably support said transferring-sheet in operative relation to said record sheet, said frame being mounted to hold the record sheet in position on said platen, and means adapted to hold an original entry sheet in operative relation to said transferring and record sheets and arranged to be moved over said platen.

15. In a manifolding device, the combination with a base adapted to receive a record sheet, of a transferring-sheet-holding device swingingly mounted on said base and adapted when swung down upon said base to hold said transferring-sheet in operative relation to said record sheet, and means adapted to hold an original entry sheet in operative relation to said transferring and record sheets and arranged to be moved over said base.

16. In a manifolding device, the combination with a base-plate adapted to receive a record sheet, of a transferring-sheet holding-frame swingingly mounted on said base-plate and adapted when swung down upon said base plate to hold said transferring sheet in operative relation to said record sheet, and means adapted to hold an original entry sheet in operative relation to said transferring and record sheets.

17. In a manifolding device, the combination with a base-plate adapted to receive a record sheet, of a frame adapted to releasably hold said record sheet in place thereon, a second frame, said frames forming a holding device for holding a transferring sheet in operative relation to said record sheet and means for releasably holding an original entry sheet in operative relation to said transferring and record sheets and arranged to be moved over said base-plate.

ELMER E. BRUNSON.

Witnesses:
C. E. PICKARD,
W. H. DE BUSK.